(12) United States Patent
Wakefield

(10) Patent No.: US 7,697,947 B2
(45) Date of Patent: Apr. 13, 2010

(54) METHOD OF COMBINING AUDIO SIGNALS IN A WIRELESS COMMUNICATION DEVICE

(75) Inventor: Ivan Nelson Wakefield, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1164 days.

(21) Appl. No.: 11/243,668

(22) Filed: Oct. 5, 2005

(65) Prior Publication Data

US 2007/0078543 A1    Apr. 5, 2007

(51) Int. Cl.
*H04B 7/00* (2006.01)
*H04B 15/00* (2006.01)

(52) U.S. Cl. .................. 455/502; 455/3.02; 455/569.1; 455/575.2; 381/2; 381/104; 381/311

(58) Field of Classification Search ................. 455/403, 455/412.1, 3.01, 3.03, 3.04, 414.1, 414.4, 455/556.1, 556.2, 569.1, 575.2, 414.3, 161.1, 455/161.2, 502; 381/119, 61, 2, 307, 86, 381/103, 104, 311
See application file for complete search history.

(56) References Cited

U.S. PATENT DOCUMENTS

| | | | | |
|---|---|---|---|---|
| 5,881,103 | A * | 3/1999 | Wong et al. .................. 375/229 |
| 7,130,608 | B2 * | 10/2006 | Hollstrom et al. ........... 455/403 |
| 7,177,432 | B2 * | 2/2007 | Eid et al. ....................... 381/22 |
| 7,376,778 | B2 * | 5/2008 | Sinai ........................... 710/312 |
| 2001/0049566 | A1 * | 12/2001 | Kim ............................. 700/94 |
| 2002/0186822 | A1 | 12/2002 | Fujisawa |
| 2003/0069655 | A1 | 4/2003 | Fahey et al. |
| 2005/0255817 | A1 * | 11/2005 | Edeler ..................... 455/161.1 |
| 2006/0094474 | A1 * | 5/2006 | Zatloukal et al. ............. 455/572 |
| 2007/0286426 | A1 * | 12/2007 | Xiang et al. ................... 381/17 |
| 2008/0056455 | A1 * | 3/2008 | Yang et al. ................ 379/88.01 |

(Continued)

FOREIGN PATENT DOCUMENTS

EP    1128643    8/2001

(Continued)

OTHER PUBLICATIONS

"javax.sound.sampled Interface Mixer," Java 2 Platform SE v1.5.0, Feb. 7, 2004, XP002411507.

(Continued)

*Primary Examiner*—Sujatha Sharma
(74) *Attorney, Agent, or Firm*—Coats & Bennett, P.L.L.C.

(57) ABSTRACT

A wireless communication device mixes audio content by combining audio signals from two or more different audio sources available at the wireless communication device and directing the mixed audio signal to a selected audio output circuit included in or associated with the wireless communication device. The audio signals can comprise received audio signals, stored audio signals, or a combination thereof. The audio signals can be synchronized, and one or more video signals may be synchronized with them. In at least one embodiment, the wireless communication device includes one or more circuits, such as a baseband or system processor, configured as a mixing circuit. An included (mixing) control circuit may be configured to control a user interface of the wireless communication device to support audio source selections, mixed audio signal output destinations, and audio signal control (volume, tone, etc.) for audio signals included in the mixed audio signal.

12 Claims, 5 Drawing Sheets

U.S. PATENT DOCUMENTS

2008/0165988 A1* 7/2008 Terlizzi et al. ............... 381/119
2008/0170703 A1* 7/2008 Zivney ......................... 381/2

FOREIGN PATENT DOCUMENTS

| WO | WO 96/27240 | 9/1996 |
| WO | WO 00/64129 | 10/2000 |
| WO | WO 2004/036367 | 4/2004 |
| WO | WO 2005/002255 | 1/2005 |

OTHER PUBLICATIONS

PCT International Search Report, International Application No. PCT/US2006/030178, Mailed: Dec. 29, 2006.
Open Mobile Alliance. "Download Architecture, Approved Version 1.0—Jun. 25, 2004." Open Mobile Alliance, OMA-Download-ARCH-V1_0-20040625-A. XP 002386521.

* cited by examiner

METHOD OF COMBINING AUDIO SIGNALS IN A WIRELESS COMMUNICATION DEVICE

BACKGROUND OF THE INVENTION

The present invention relates to wireless communication devices, such as cellular radiotelephones, and particularly relates to mixing audio content in wireless communication devices.

Wireless communication devices historically provided only basic communication functions. Limited battery performance and the lack of inexpensive user interface elements (graphical displays, decent audio components, etc.) represent some of the reasons underlying the paucity of extra features in older wireless communication devices. Further, network capabilities played into the mix of feature inclusion considerations. Early wireless communication networks offered traditional circuit-switched voice and fax services, and little else.

As such, "live" voice communications represented the only source for the audio signals handled by these older, traditional communication handsets. In contrast, contemporary wireless communication devices generally must select and play desired audio (and video) content from a variety of possible sources. The added complexity arises because contemporary wireless communication devices and their supporting networks offer a range of functions and services.

For example, increased data rates and support for Internet protocols enable the delivery of multimedia content by current wireless communication networks to appropriately configured portable devices. Moreover, the increased memory and improved user interfaces of such devices enhance their users' multimedia playback experience and, against this backdrop, it is not uncommon for a communication handset to double as a music or multimedia player, capable of playing audio and/or video content received over the air in a streaming format or as a file download, or transferred to the handset through its local communication interface (e.g., USB port).

SUMMARY OF THE INVENTION

The methods and devices taught herein provide a wireless communication device that combines (mixes) audio signals from different sources to form a mixed audio signal and to direct the mixed audio signal to a selected output circuit included in or associated with the wireless communication device. According to one embodiment, a method comprises combining audio signals from two or more different audio sources available at the wireless communication device to form a mixed audio signal and directing the mixed audio signal to a selected audio output circuit included in or associated with the wireless communication device.

By way of non-limiting example, the wireless communication device, which may comprise a cellular radiotelephone, mixes audio signals from different sources for output to its included speaker(s) or for external output to a hands-free speaker. The mixed audio signal may include audio content from an ongoing voice call with audio content received through a concurrent multimedia call or played back from a local memory store of the device. As a further non-limiting example, the device may mix local audio (e.g., microphone input) with audio content being received by the device through a cellular or other wireless communication link or being played back from a local memory store, for outgoing transmission.

Thus, in one or more embodiments, the wireless communication device comprises circuitry operable to combine audio signals from two or more different audio sources available at the wireless communication device to form a mixed audio signal and to direct the mixed audio signal to a selected audio output circuit included in or associated with the wireless communication device. It should be understood that the selected audio output "circuit" may comprise a transmitter for outgoing transmission of mixed audio on a cellular or short-range link and/or may comprise any one or more of the device's local audio output circuits (earpiece output, internal speaker output, hands free output, etc.) It further should be understood that the mixing circuitry, referred to herein as a "mixer circuit" may be implemented in hardware, in software, or in any combination thereof. Thus, the mixer circuit may comprise digital circuits, analog circuits, or some mix thereof.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
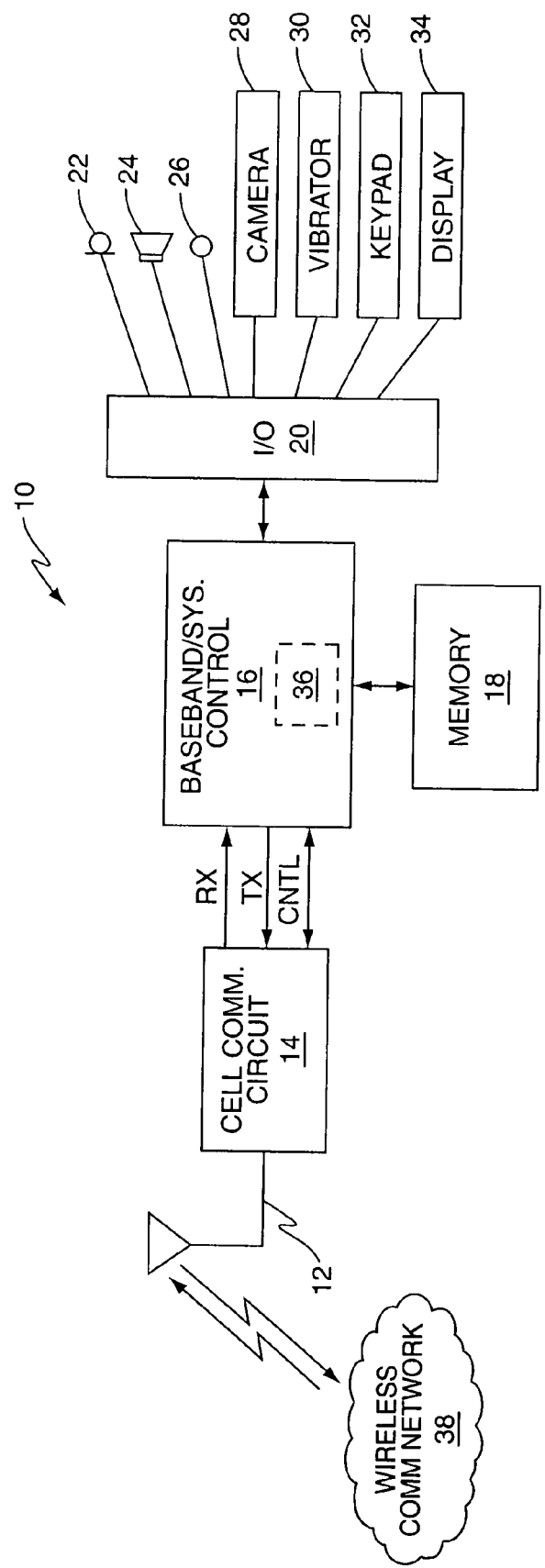
FIG. 1 is a block diagram of a wireless communication device that includes one or more audio processing circuits for combining audio signals.

FIG. 1 is a block diagram of a wireless communication device 10 that comprises a receive/transmit antenna 12, a wireless communication circuit 14, baseband/system control circuits 16, memory circuits 18, input/output (I/O) interface circuits 20, and a user interface including a microphone 22, a speaker 24, an audio line out circuit 26, a camera 28, a vibrator 30, a keypad 32, and a display screen 34. Of course, it should be understood that one or more of the illustrated user interface devices may be omitted from the wireless communication device 10, or other user interface elements may be added, as needed or desired, and it should be understood that the term "wireless communication device" as used herein should be construed broadly. Non-limiting examples of such devices include cellular communication handsets and other types of mobile stations, wireless PDAs, palmtop/laptop computers, pagers, and the like.

Further, it should be understood that the wireless communication circuit 14 can comprise any suitable circuits capable of transmitting and receiving wireless signals such as a wireless transmitter and receiver or a wireless transceiver. In one embodiment, the wireless communication circuit at least comprises a cellular communication transceiver, e.g., a receiver circuit that is configured to provide signal information obtained from over-the-air signals received from a supporting wireless communication network 38 to the baseband/system control circuits 16, and a transmitter circuit that is configured to generate/transmit over-the-air signals to the network 38 responsive to transmit signal information output by the baseband/system control circuits 16.

Additionally, or alternatively, the wireless communication circuit 14 may comprise or include other types of wireless interfaces, e.g., transceiver circuits, configured for wide area and/or local area communication. Non-limiting examples include radio transceiver circuits configured for WiMax (IEEE 802.16), WiFi (IEEE 802.11b/g) communication, and Bluetooth or other Wireless Personal Area Network (WPAN) standards. In general, it should be understood that the device 10 can be configured to support local and longer-range wireless communication, and that, as taught herein, audio content for mixing may be received through any one or more of such interfaces, and mixed audio content may be directed to any one or more of such interfaces for output.

With this flexibility in mind, and as explained in detail later herein, the baseband/system control circuits 16 included audio mixing circuit(s) 36 that are configured to select audio signals from two or more different audio sources available at the wireless communication device, combine the selected audio signals to form a mixed audio signal, and direct the mixed audio signal to a selected audio output circuit included in or associated with the wireless communication device 10. As one example, the (audio mixing) circuits may be implemented in software by executing program instructions on a general purpose or specialized digital processing circuit.

On that point, it should be noted that the baseband/system control circuits 16 can be implemented in hardware, software, or any combination thereof. In one embodiment, the baseband/system control circuits 16 comprise one or more digital processing circuits configured to process signal information received and transmitted by the wireless communication circuit 14, and to control overall operation of the wireless communication device, including the device's user interface circuits. As such, the baseband/system control circuits 16 may comprise one or more general purpose microprocessors executing appropriate computer program instructions, and/or one or more Digital Signal Processors (DSPs), Application Specific Integrated Circuits (ASICs), Field Programmable Gate Arrays (FPGAs), or any suitable combination thereof.

In any case, the wireless communication circuit 14 represents one source of audio signals that may be selected for audio mixing as taught herein. For example, the wireless communication circuit 14 may receive voice on one communication channel signal and receive music or other multimedia content on another communication channel, and either or both such signals may be used for audio mixing. In general, audio content obtained from one or more over-the-air signals received by the wireless communication circuit 14 may be selected for inclusion in a mixed audio signal formed by a mixing circuit included as hardware, software, or any combination thereof, in the baseband/system control circuits 16.

Regardless of mixing circuit implementation details, the wireless communication device 10 may be configured to carry out a method of mixing audio content comprising combining audio signals from two or more different audio sources available at the device 10 to form a mixed audio signal, and directing the mixed audio signal to a selected audio output circuit included in or associated with the device 10. Audio output circuits available for selection include, but are not limited to, the speaker 24, the audio line out circuit 26 (which may drive a headset or other hands-free communication set), and the wireless communication circuit 14 (i.e., audio output for transmission over the air interface of the device 10).

To support such functionality, the device 10 may be configured to use one or more elements of the user interface to provide audio controls for one or more of the audio signals included in the mixed audio signal. For example, configuring the device's user interface may comprise configuring the user interface to provide independent volume or tonal control of at least one of the audio signals included in the mixed audio signal. Such controls may comprise adjustment options/instructions displayed on the display 34 and adjustment controls comprising keys included in the keypad 32 or soft keys on the display 34.

Regardless of such implementation details, the audio signals to be mixed may comprise a first audio signal obtained from an over-the-air signal being received by the device 10 and a second audio signal obtained from stored audio content held in the memory 18 of the device. The memory 18 may comprise one or more memory circuits and may comprise any one or more of volatile and non-volatile memory circuits, such as EEPROM, FLASH, MRAM, SRAM, DRAM, etc. In this context, the step of directing the mixed audio signal to a selected audio output circuit included in or associated with the device 10 may comprise one of directing the mixed audio signal to an internal or external speaker output of the device 10 (e.g., to the speaker 24 or to the audio output circuit 26), or to the wireless transmitter circuit 14 for over-the-air transmission. Such capabilities allow, for example, audio content received on a given communication channel to be mixed with locally stored audio content for local playback or for retransmission.

In another signal mixing combination, the audio signals comprise first and second audio signals obtained from over-the-air signals being received by the device 10 via the wireless communication circuit 14. The mixed audio signal may be directed to the speaker 24 or to the audio output circuit 26 for local playback, or may direct the wireless communication circuit 14 for over-the-air transmission to a remote receiver. Such capabilities allow, for example, audio content received on two different communication channels to be mixed together for local output or for retransmission.

In another signal mixing combination, the audio signals comprise a first audio signal obtained from an audio input circuit of the device (e.g., the microphone 22), and a second audio signal obtained from the wireless communication circuit 14 or from the memory 18 (e.g., stored audio content). Such capabilities allow, for example, a user's voice or other local audio input to be mixed with audio content from a received signal (e.g., audio content in a voice or data call), for transmission over the air interface or for local output at the device 10.

In another mixing signal combination, the audio signals comprise first and second audio signals obtained from stored audio content held in the memory 18 of the device 10. As such, directing the mixed audio signal to a selected audio output circuit included in or associated with the device 10 may comprise directing the mixed audio signal to the speaker 24 or to the audio output circuit 26, or to the wireless communication circuit 14 for over-the-air transmission.

Of course, it should be understood that the circuit(s) 36 can be configured to mix audio signals from a variety of audio sources, such as audio signals obtained from first and second communication channels, respectively, being received through the wireless communication circuit 14. Thus, audio content from a first call may be mixed with audio content from a second, concurrent call, for output to the speaker 24, the audio output circuit 26, or for retransmission by the wireless communication circuit 14. Such a configuration allows, for example, the wireless communication device 10 to mix together audio from different calling parties or to mix voice from one channel with music from another channel.

In this mixing context, and in others, the circuit(s) 36 may be configured to form the mixed audio signal based on synchronizing two or more of the included audio signals. For example, playback of a stored music file may be synchronized to the start of voice call or to an incoming audio stream received over the air interface. Moreover, as detailed later herein, synchronized mixing also may include the synchronization of one or more video signals with the audio content. For example, the circuit(s) 36 may synchronize video output shown on the display 34 with the mixed audio signal, or with a particular one of the audio signals included in the mixed audio signal.

With or without such synchronization, the circuit(s) 36 also may be configured to direct the mixed audio signal to a selected audio output circuit based on selecting a particular audio output circuit for the mixed audio signal in accordance with one or a combination of a user input selection, a content type of one or more of the audio signals, a content protection scheme of one or more of the audio signals, or a frequency response of one or more of the audio signals. As an example, rights-management information associated with a stored music file may allow the corresponding audio content to be output in analog format on the speaker 24 or on the audio output circuit 26, but disallow digital (or analog) retransmission. As such, mixed audio signals containing such rights-protected content may be automatically steered to one or more of the allowed outputs, and automatically disallowed from being steered to the wireless communication circuit 14 for retransmission. Other selection schemes may be implemented as well, such as selecting the audio output circuit 26 by default for mixed audio signals that include music for local playback.

The circuit(s) 36 also may be configured to adjust volume or tone of one or more of the audio signals included in the mixed audio signal as a function of one or more of audio signal source type, audio signal content protection scheme, or audio signal frequency response. As one example, the circuit(s) 36 may be configured to automatically mix the audio signal from an incoming voice call with the audio signal from any ongoing music playback to form the mixed audio signal for output to the speaker 24, for example. Further, the music playback volume can be decreased as part of that automatic mixing, so that the voice call is easily audible over the music. This method enables a user of the device 10 to make and receive phone calls while simultaneously listening to music or other audio content. The outgoing voice signal also may include mixed content, so that the calling party hears the same music or other audio content as a "background" to the voice call.

Volume and tonal control may make use of the relatively rich user interface controls available at the device 10. For example, the circuit(s) 36 may functionally include a control circuit that is configured to use the keypad 32 and/or display 34 of the device's user interface to provide independent volume or tonal control of at least one of the audio signals included in the mixed audio signal. Thus, the audio signals included in a mixed audio signal may be identified on-screen and on-screen (and/or keypad) controls may be used to select one or more of the included audio signals for adjustment. Thus, the user may be given independent volume and tonal adjustments for any of the one or more audio signals included in the mixed audio signal. Such controls also may allow the user to select the particular audio signals to be mixed (or at least select the audio sources from which the constituent audio signals are to be selected for mixing), and to select the audio output circuit(s) to which a mixed audio signal should be directed. Of course, the controls may be configured to allow the user to set up default mixing scenarios (e.g., always mix incoming voice with currently playing music, etc.), preferred source and output circuits, and the like.

Figure 2:
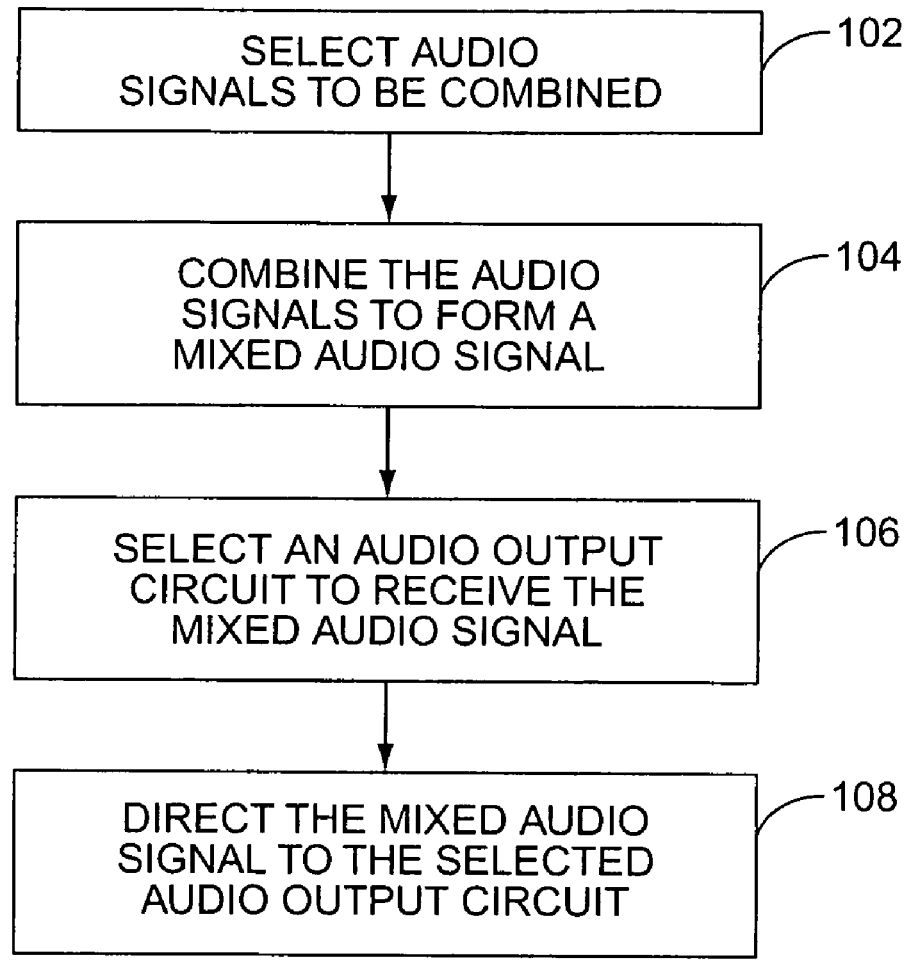
FIG. 2 is a logic flow diagram of one embodiment for combining audio signals by a wireless communication device.

With the above details and embodiments in mind, FIG. 2 illustrates processing logic embodying a method of combining audio signals from two or more different audio sources available at the device 10 to form a mixed audio signal and directing the mixed audio signal to a selected audio output circuit included in or associated with the device 10. For ease of description, the method (and variations of it) will be described in accordance with the device 10 as illustrated in FIG. 1. However, it will be understood by those skilled in the art that the method(s) described herein can be performed by essentially any suitably configured wireless communication device.

The method begins with the wireless communication device 10 selecting audio signals from two or more different audio sources available at the device 10 (Step 102). Such selection may be performed according to stored default information, or responsive to receiving selection inputs from a user of the device 10. In any case, the audio signals can be received over the air by the wireless communication device 10 from the supporting wireless communication network 38 and/or can be accessed from memory such as the memory circuits 18. For over-the-air reception of audio content, it should be understood that different communication channels may be involved. For example, voice may be received over a circuit-switched or a packet-switched communication channel established between the device 10 and the network 38, and audio content (MP3, WMA, MPEG, streaming media, electronic feed such as podcast, etc.) can be received concurrently over another communication channel being supported by the device 10.

The method continues with the (mixing) circuit(s) 36 combining the audio signals to form a mixed audio signal (Step 104). The circuit(s) 36 can comprise any suitable firmware and/or hardware capable of combining the audio signals as previously described. As such, it should be understood that digital, analog, and mixed digital/analog embodiments are contemplated herein, and that at least a portion of the circuit(s) 36 may be implemented in the I/O interface circuits 20, such as analog signal mixers, source and output selection circuits (e.g., muxes/demuxes).

Regardless, the method continues with selecting an audio output circuit to receive the mixed audio signal (Step 106). The selected audio output circuit can be any circuit included in or associated with the wireless communication device 10 operable to receive audio signals. For example, the selected output circuit can be one or more of the user interface devices 22-34 and/or a wireless transmitter of the wireless communication circuit 14.

For illustrative purposes only, the I/O interface circuits 20 can select the audio output circuit to receive the mixed audio signal. Alternatively, the baseband/system control circuits 16 can provide one or more control signals to the I/O interface circuits 20 and/or the wireless communication circuit 14, thereby directing the I/O interface circuits 20 and/or the wireless communication circuit 14 to select one or more audio output circuits. An audio output circuit can be selected in accordance with any suitable criterion, such as, for example, a user input, a content type of one or more of the audio signals, a content protection scheme of one or more of the audio signals, or a frequency response of one or more of the audio signals.

For illustrative purposes only, the one or more audio processing circuits 36 can prevent the mixed audio signal from being directed to a wireless transmitter of the wireless communication circuit 14 for transmission over the wireless communication network 38 if one or more of the combined audio signals are protected by a content protection scheme such as Digital Rights Management (DRM). In another non-limiting illustrative example, the one or more audio processing circuits 36 can direct the mixed audio signal to an audio output circuit as directed by a user of the device 10, for example.

The method continues with directing the mixed audio signal to the selected audio output circuit (Step 108). A given mixed audio signal can be directed to the I/O interface circuits 20, so that it can be directed to one or more audio output circuits, and the same of different mixed audio signals can be directed simultaneously to more than one audio output circuit, e.g., to the speaker 24 and to the audio output circuit 26. Moreover, the same or different mixed audio signals can be directed simultaneously to the I/O interface circuits 20 and to the wireless communication circuit 14. Thus, mixed audio can be output locally and transmitted over the air interface for remote output.

Figure 3:
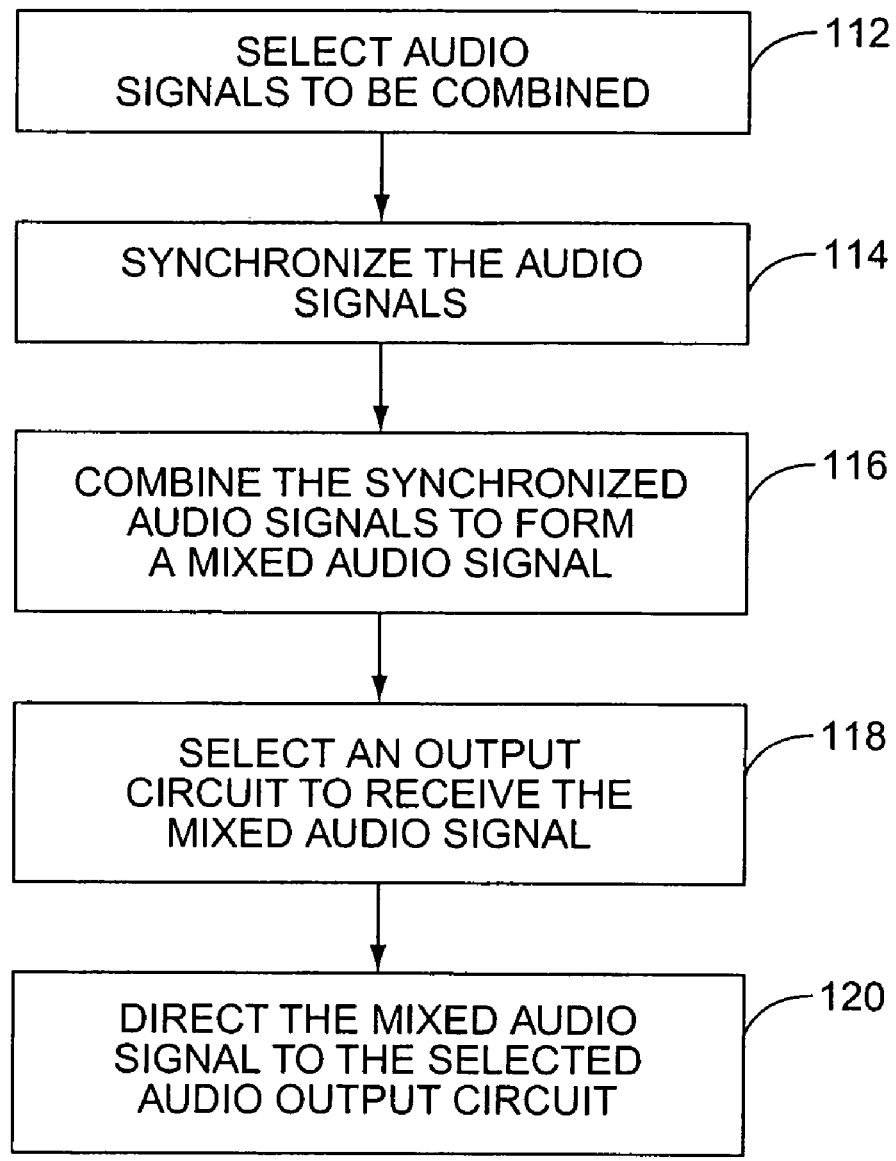
FIG. 3 is a logic flow diagram of another embodiment for combining audio signals by a wireless communication device.

FIG. 3 illustrates another embodiment of processing logic similar to that shown in FIG. 2, but including audio synchronization logic that may be used in generating the mixed audio signal. As such, two or more of the audio signals to be included in the mixed audio signal can be synchronized as part of the mixing operations.

The method begins with automatic or user-based selection of audio signals from two or more different audio sources available at the device 10 as previously described (Step 112). The method continues with the one or more audio processing circuits 36 synchronizing the audio signals before combining them (Step 114). That is, the one or more audio processing circuits 36 synchronize time and/or playback references in the audio signals to produce a synchronized audio mix.

As one example, playback of a selected audio file can be configured to start in synchronization with the start of a voice conversation. As another example, two stored files, such as a podcast commentary file and a music file, can be synchronized for simultaneous, mixed playback (e.g., the music serves as background for the podcast commentary). Regardless, the one or more audio processing circuits 36 can synchronize the audio signals automatically, that is, without user intervention, in accordance with some predetermined synchronization algorithm. Alternatively, the one or more audio processing circuits 36 can synchronize the audio signals in accordance with a user input, for example, by the user selecting one or more keys of the keypad 32 or by voice command. In any case, the method continues with combining the synchronized audio signals (Step 116), selecting an audio output circuit to receive the mixed audio signal (Step 118), and directing the mixed audio signal to the selected audio output circuit (Step 120), each as previously described.

Figure 4:
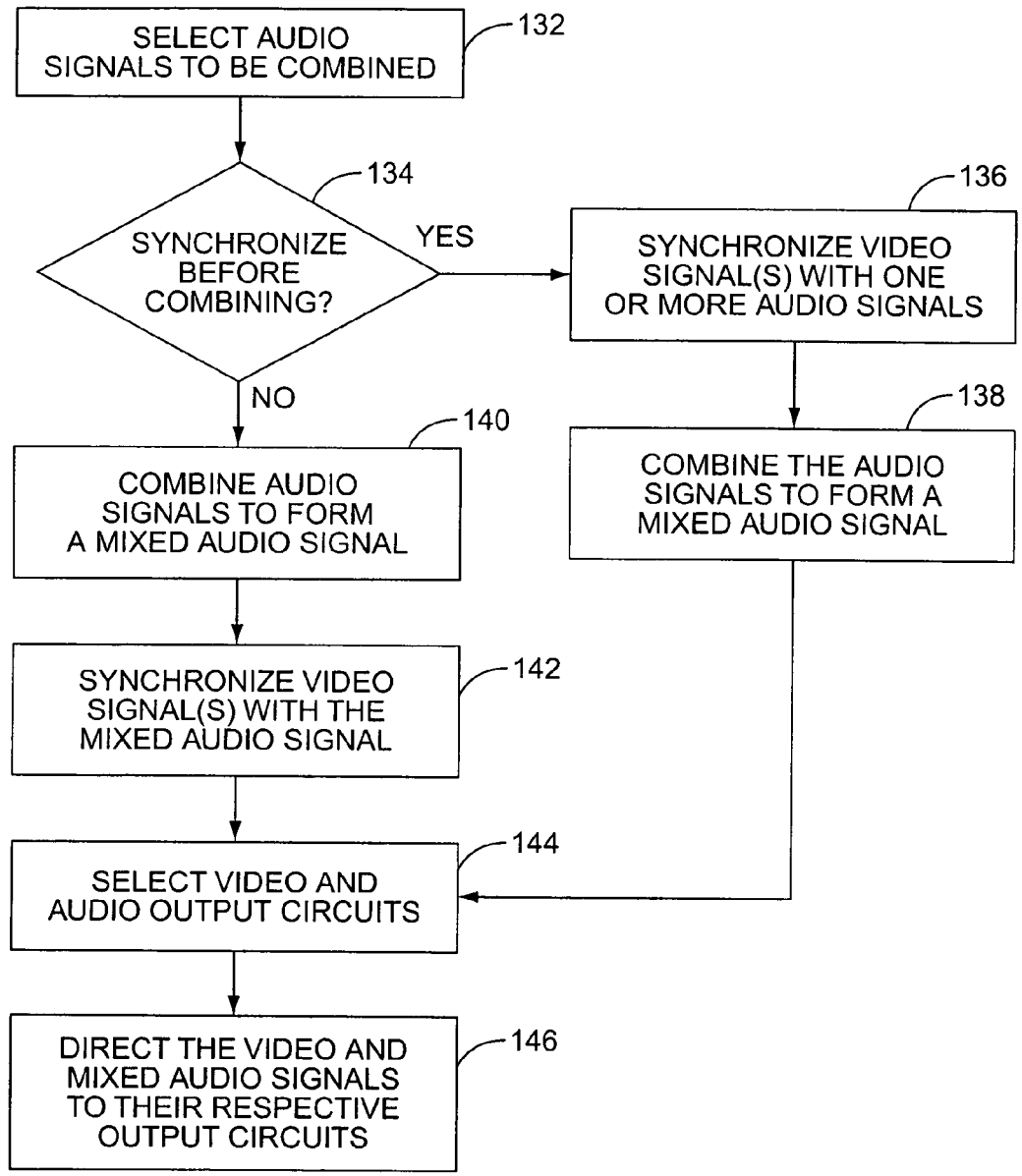
FIG. 4 is a logic flow diagram of another embodiment for combining audio signals by a wireless communication device.

FIG. 4 illustrates another embodiment of processing logic that is similar to that shown in FIG. 2, but including video synchronization processing logic wherein one or more video signals are also selected for synchronization with one or more of the audio signals included in the mixed audio signal, or with the mixed audio signal itself. As such, a video signal can be directed to a particular video output circuit in synchronization with the mixed audio signal being directed to a particular audio output circuit. The method begins with the wireless communication device 10 selecting audio signals from two or more different audio sources available at the device 10, as previously described, and selecting a source for one or more video signals also available at the device 10 (Step 132). For illustrative purposes only, the video signal can be a video component of a multimedia signal, such as a multimedia signal derived from an MPEG file. In that context, one of the audio signals to be mixed is the audio content from a stored multimedia file.

The method continues with the one or more audio processing circuits 36 determining whether to synchronize the video signal(s) with one or more of the audio signals before or after the audio signals are combined (Step 134). If the one or more audio processing circuits 36 determine to synchronize prior to combining the audio signals, then the one or more audio processing circuits 36 synchronize the video signal(s) with one or more of the audio signals (Step 136). That is, the one or more audio processing circuits 36 cause one or more audio signals and the video signal(s) to be aligned with near precise coincidence in time or rate. The one or more audio processing circuits 36 can synchronize the audio and video signals automatically or in response to a user input, both as previously described. The audio signals are then combined to form a mixed audio signal (Step 138) as previously described.

If the one or more audio processing circuits 36 determine to synchronize after combining the audio signals, then the method continues with combining the audio signals to form a mixed audio signal (Step 140) as previously described. The one or more audio processing circuits 36 then synchronize the video signal(s) with the mixed audio signal (Step 142) as previously described. That is, the one or more audio processing circuits 36 cause the mixed audio signal and the video signal(s) to be aligned with near precise coincidence in time or rate. The one or more audio processing circuits 36 can synchronize the audio and video signals automatically or in response to a user input, both as previously described.

Regardless of when signal synchronization occurs, the method continues with selecting an audio output circuit to receive the mixed audio signal, as previously described, and selecting a video output circuit to receive the video signals (Step 144). The selected video output circuit can be any circuit included in or associated with the wireless communication device 10 operable to receive video signals. For example, the selected video output circuit can be display screen 34 and/or a wireless transmitter of the cellular communication circuit 14. For illustrative purposes only, the I/O interface circuits 20 can select the video output circuit to receive the video signal. Alternatively, the baseband/system control circuits 16 can provide one or more control signals to the I/O interface circuits 20 and/or the cellular communication circuit 14, thereby directing the I/O interface circuits 20 and/or the cellular communication circuit 14 to select one or more video output circuits.

A video output circuit can be selected in accordance with any suitable parameter, such as, for example, a user input, a content type of the video signal, or a content protection scheme of the video signal. For illustrative purposes only, the circuit(s) 36 can be configured to prevent the video signal from being transmitted over the air interface of the device 10 if the video signal is protected by a content protection scheme such as DRM. In another illustrative example, the baseband/system control circuits 16 can direct the video signal to a video output circuit as directed by a user of the wireless communication device 10, for example, by the user selecting one or more keys of the keypad 32 or by voice command.

Regardless, the method continues with directing the mixed audio signal to the selected audio output device, as previously described, and directing the video signal(s) to the selected video output circuit (Step 146). For illustrative purposes only, the mixed audio signal and synchronized video signal can be directed to the I/O interface circuits 20 and/or one or both of them can be directed to the wireless communication circuit 14 for over-the-air transmission.

Figure 5:
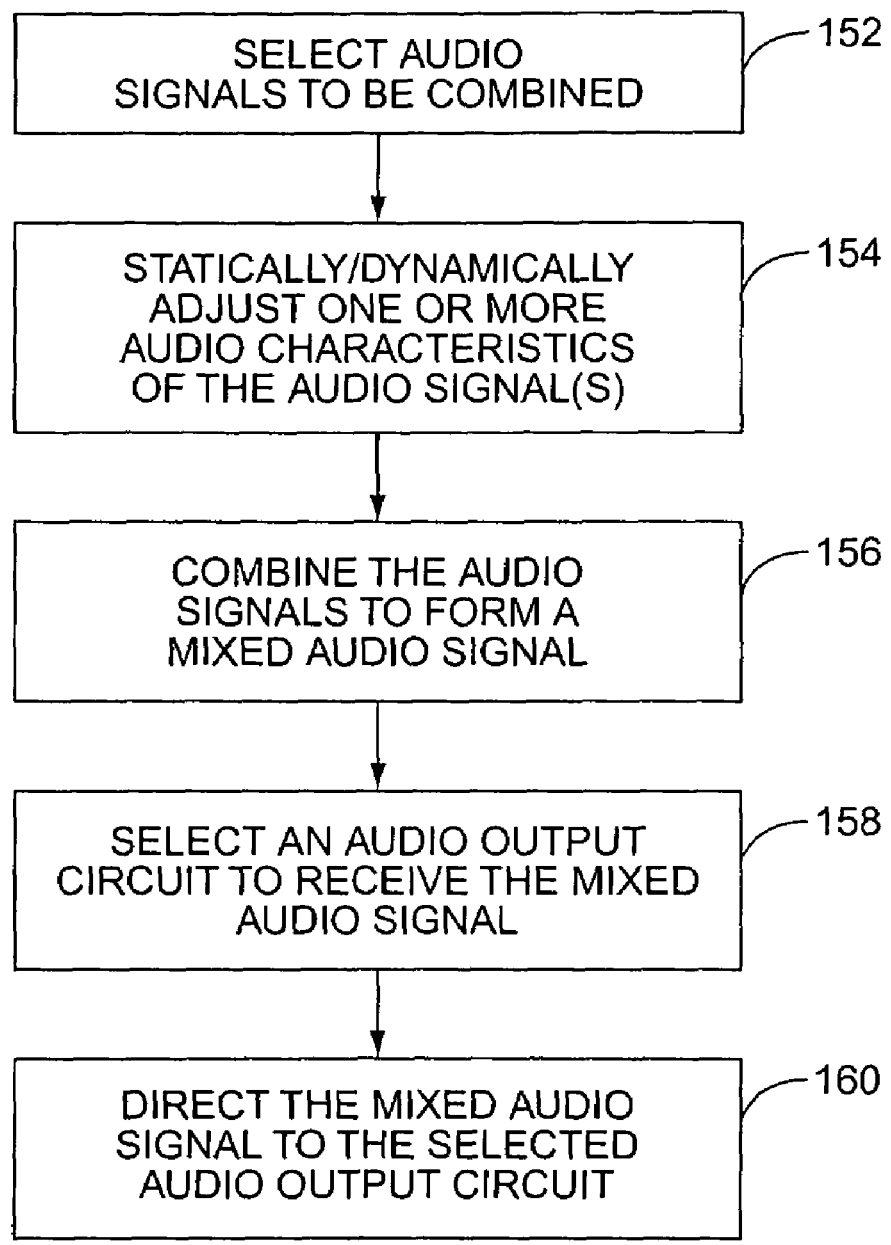
FIG. 5 is a logic flow diagram of another embodiment for combining audio signals by a wireless communication device.

FIG. 5 illustrates another embodiment of processing logic that is similar to that shown in FIG. 2, but including processing logic for adjusting audio characteristics (e.g., volume, tone, etc.) of one or more of the audio signals included in the audio mix. In more detail, audio characteristics, such as volume, frequency, tone, or bass, can be adjusted for any audio signal in the mix independent of other audio signals in the mix.

The method begins with the selection of audio signals from the desired audio sources, as previously described (Step 152). The method continues with adjusting one or more audio characteristics of one or more of the audio signals (Step 154). Such adjustments may be made prior to outputting the mixed audio signal, or may be made dynamically one or more times during output of the mixed audio signal.

Additionally, an audio characteristic of an audio signal can be adjusted in accordance with one or more of a user input, a content type of one or more of the audio signals, a content protection scheme of one or more of the audio signals, or a frequency response of one or more of the audio signals. For illustrative purposes only, the one or more audio processing circuits 36 can decrease the volume of a stored audio signal being mixed with a real-time audio signal so that the real-time audio signal is more audible than the stored audio signal when the real-time audio signal is being received by the wireless communication device 10. The method continues with combining the audio signals (Step 156), selecting an audio output circuit to receive the mixed audio signal (Step 158), and directing the mixed audio signal to the selected audio output circuit (Step 160), each as previously described.

The several embodiments described herein teach a wireless communication device and a method of mixing audio content in a wireless communication device comprising combining audio signals from two or more different audio sources available at the wireless communication device to form a mixed audio signal and directing the mixed audio signal to a selected audio output circuit included in or associated with the wireless communication device. The audio signals can comprise real-time audio signals received over the air interface of the device, for example, or stored audio signals, or any combination thereof. The audio signals can be synchronized as part of the mixing process, and one or more video signals can be synchronized as well. Further, the mixing process can be configured to allow for independent audio adjustments to be made to any one or more of the audio signals included in the mixed audio signal.

Thus, while the invention has been described in terms of specific embodiments, it should be understood that the present invention is not limited by the foregoing description, nor is it limited by the accompanying drawings. Instead, the present invention is limited only by the following claims and their legal equivalents.

What is claimed is:

1. A method of mixing audio content in a wireless communication device, comprising:
    combining audio signals from two or more different audio sources available at the wireless communication device to form a mixed audio signal;
    selecting an audio output circuit from two or more audio output circuits included in or associated with the wireless communication device, based on one or more of a content type of one or more of the audio signals, a content protection scheme of one or more of the audio signals, and a frequency response of one or more of the audio signals; and
    directing the mixed audio signal to the selected audio output circuit.

2. The method of claim 1, wherein the two or more audio output circuits include a wireless transmitter circuit, an internal speaker output, and an external speaker output, and wherein selecting the audio output circuit comprises selecting the wireless transmitter circuit if any one or more of the audio signals is a microphone audio signal intended for an outgoing voice call from the wireless communication device to a supporting wireless communication network.

3. The method of claim 1, wherein the two or more audio output circuits include a wireless transmitter circuit, an internal speaker output, and an external speaker output, and wherein selecting the audio output circuit comprises selecting at least one of the external and internal speaker outputs if one of the audio signals is an incoming audio signal received for a voice call the wireless communication device is engaged in.

4. The method of claim 1, wherein the two or more audio output circuits include a wireless transmitter circuit, an internal speaker output, and an external speaker output, and wherein selecting the audio output circuit comprises the external speaker output if the audio signals are music signals, or in dependence on the frequency response of one or more of the audio signals.

5. The method of claim 1, wherein the two or more audio output circuits include a wireless transmitter circuit, an internal speaker output, and an external speaker output, and wherein selecting the audio output circuit includes disallowing selection of the wireless transmitter circuit if any of the audio signals are rights-restricted signal types having retransmission restrictions.

6. The method of claim 1, further comprising receiving user preferences identifying preferred ones of the two or more audio circuits to be selected for given content types of audio signals, and wherein selecting an audio circuit from the two or more audio circuits comprises determining the content types of the audio signals and the corresponding user preferences.

7. A wireless communication device, comprising one or more circuits configured to:
    select audio signals from two or more different audio sources available at the wireless communication device;
    combine the selected audio signals to form a mixed audio signal;
    select an audio output circuit from two or more audio output circuits included in or associated with the wireless communication device, based on one or more of a content type of one or more of the audio signals, a content protection scheme of one or more of the audio signals, and a frequency response of one or more of the audio signals; and
    direct the mixed audio signal to the selected audio output circuit included in or associated with the wireless communication device.

8. The wireless communication device of claim 7, wherein the two or more audio output circuits include a wireless transmitter circuit, an internal speaker output, and an external speaker output, and wherein the one or more circuits of the wireless communication device are configured to select the wireless transmitter circuit as the selected audio output circuit, if any one or more of the audio signals is a microphone audio signal intended for an outgoing voice call from the wireless communication device to a supporting wireless communication network.

9. The wireless communication device of claim 7, wherein the two or more audio output circuits include a wireless transmitter circuit, an internal speaker output, and an external speaker output, and wherein the one or more circuits of the wireless communication device are configured to select at least one of the external and internal speaker outputs as the selected audio output circuit, if one of the audio signals is an incoming audio signal received for a voice call the wireless communication device is engaged in.

10. The wireless communication device of claim 7, wherein the two or more audio output circuits include a wireless transmitter circuit, an internal speaker output, and an external speaker output, and wherein the one or more circuits of the wireless communication device are configured to select the external speaker output as the selected audio output circuit, if the audio signals are music signals, or in dependence on the frequency response of one or more of the audio signals.

11. The wireless communication device of claim 7, wherein the two or more audio output circuits include a wireless transmitter circuit, an internal speaker output, and an external speaker output, and wherein the one or more circuits of the wireless communication device are configured to disallow selection of the wireless transmitter circuit as the selected audio output circuit, if any of the audio signals are rights-restricted signal types having retransmission restrictions.

12. The wireless communication device of claim 7, wherein the one or more circuits are configured to receive user preferences identifying preferred ones of the two or more audio circuits to be selected for given content types of audio signals, and wherein the one or more circuits are configured to select an audio circuit from the two or more audio circuits based on determining the content types of the audio signals and the corresponding user preferences.

* * * * *